(12) United States Patent
Nitz et al.

(10) Patent No.: US 8,829,895 B2
(45) Date of Patent: Sep. 9, 2014

(54) MACHINE WITH POSITION DETERMINATION OF RELATIVE ROTATABLE MEMBERS

(75) Inventors: Gernot Nitz, Augsburg (DE); Stefan Roth, Eisenbrechtshofen (DE); Dietmar Tscharnuter, Friedberg (DE)

(73) Assignee: KUKA Roboter GmbH, Augsburg (DE)

( * ) Notice: Subject to any disclaimer, the term of this patent is extended or adjusted under 35 U.S.C. 154(b) by 185 days.

(21) Appl. No.: 13/444,499

(22) Filed: Apr. 11, 2012

(65) Prior Publication Data

US 2012/0262156 A1 Oct. 18, 2012

(30) Foreign Application Priority Data

Apr. 18, 2011 (DE) .................... 10 2011 007 609

(51) Int. Cl.
| | | |
|---|---|---|
| G01B 7/30 | (2006.01) | |
| G01D 5/249 | (2006.01) | |
| B25J 17/02 | (2006.01) | |
| G05B 19/401 | (2006.01) | |
| G01D 5/14 | (2006.01) | |
| B25J 9/16 | (2006.01) | |

(52) U.S. Cl.
CPC .......... G05B 19/4015 (2013.01); G01D 5/2492 (2013.01); B25J 17/025 (2013.01); G01D 5/145 (2013.01); B25J 9/1692 (2013.01)
USPC .................................. 324/207.2; 324/207.25

(58) Field of Classification Search
USPC .......................................... 324/207.2, 207.25
See application file for complete search history.

(56) References Cited

U.S. PATENT DOCUMENTS

| 5,493,216 A | * | 2/1996 | Asa ............................. 324/207.2 |
| 5,672,135 A | * | 9/1997 | Hamada ........................ 475/149 |
| 5,998,989 A | * | 12/1999 | Lohberg ........................ 324/174 |
| 7,791,334 B2 | * | 9/2010 | Fischer .................... 324/207.25 |
| 2011/0187355 A1 | * | 8/2011 | Dixon et al. ............. 324/207.25 |
| 2013/0147466 A1 | * | 6/2013 | Baek et al. ................. 324/207.2 |

FOREIGN PATENT DOCUMENTS

| DE | 32 18 298 A1 | 12/1982 |
| DE | 195 46 180 A1 | 7/1996 |
| DE | 695 10 965 T2 | 1/2000 |
| DE | 101 30 498 A1 | 1/2003 |
| DE | 10 2010 045 532 A1 | 5/2011 |
| EP | 1 288 756 B1 | 3/2003 |

OTHER PUBLICATIONS

German Patent Office; Office Action in German Patent No. 10 2011 007 609.3 dated Mar. 5, 2012; 5 pages.

* cited by examiner

*Primary Examiner* — Jay Patidar
(74) *Attorney, Agent, or Firm* — Wood, Herron & Evans, LLP

(57) ABSTRACT

The invention relates to a machine comprising a first member, a rotatable second member rotatable relative to the first member relative to an axis, a control device, a drive connected with the control device for moving the two members relative to one another, and a first Hall sensor connected with the control device and arranged on the first member. On the second member, a first, second and third magnet are arranged next to each other on a common circular trajectory such, that during a rotation of the two members relative to one another, the first Hall sensor is located at a specific position in the detection zone of the magnets. The second magnet which is developed as the center magnet is facing towards the first Hall sensor with another magnetic pole than the first and third magnet.

19 Claims, 10 Drawing Sheets

Figure 1:
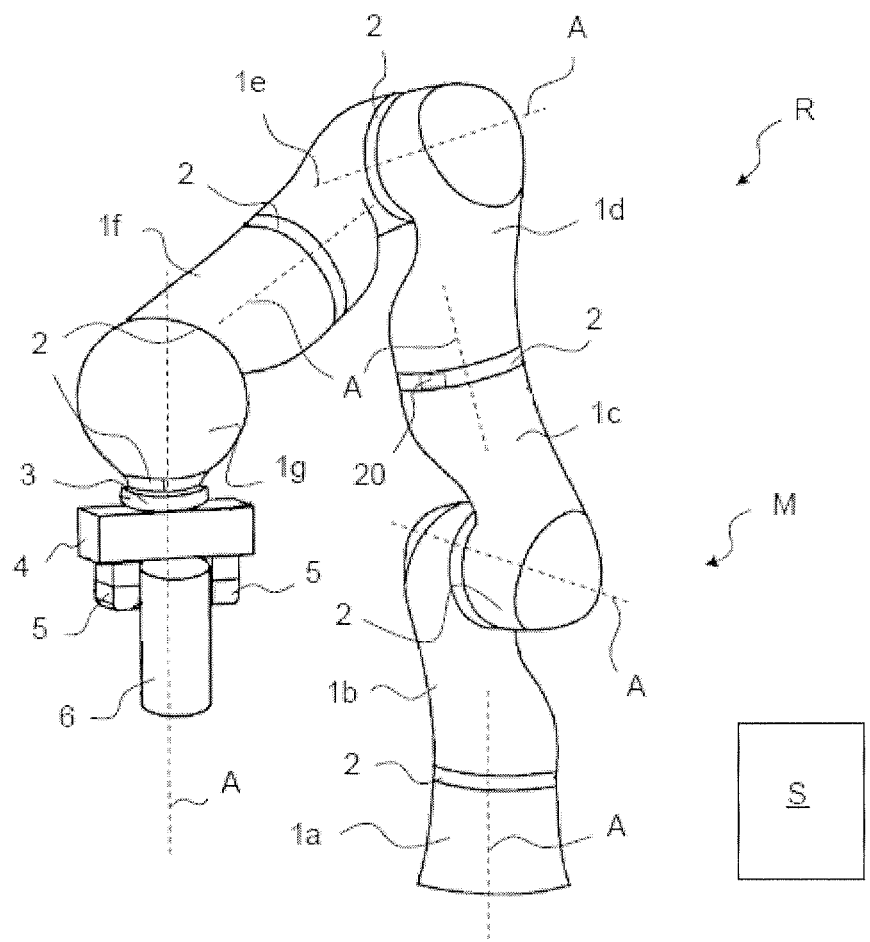

| Condition | Adjustment | Adjustment reference | Lower cut-off region | Upper cut-off region | Normal operation |
|---|---|---|---|---|---|
| Sensor 21 | SNS | N | | | other |
| Sensor 22 | - | N | N | S | other |

FIG. 5

| Condition | Adjustment | Adjustment reference | Lower cut-off region | Lower cut-off region | Upper cut-off region | Upper cut-off region | Normal operation |
|---|---|---|---|---|---|---|---|
| Sensor 21 | SNS | N | S | | N | | other |
| Sensor 22 | - | N | N | N | S | S | other |

FIG. 7

| Condition | Adjustment | Adjustment reference | Lower cut-off region | Upper cut-off region | Normal operation |
|---|---|---|---|---|---|
| Sensor 21 | SNS | N | N | S | other |
| Sensor 22 | S | N | | | other |

FIG. 9

MACHINE WITH POSITION DETERMINATION OF RELATIVE ROTATABLE MEMBERS

The invention relates to machine with members that are rotatable relative to one another.

An example of a machine with a reciprocal rotatable member is a robot. Robots generally are handling machines that are equipped with useful tools for the automatic handling of objects, and which are programmable with respect to orientation, position, and sequence of operations in several axes of motion. Robots usually have a robot arm with several members and programmable controls (control devices), which control and adjust the sequences of motions of the robot arm during operation. The drives are electrical drives, for example, and the members are axes that are pivotable relative to one another.

EP 1 288 756 B1 discloses a method for the creation of reference data with which the relative position of a movable part of a program-controlled, multi-axially movable robot is determined with respect to another part. A permanent magnet is arranged on one of the parts and at least two Hall generators are arranged on the other part, the output voltages of which change when approaching the permanent magnet. The relative position of the two parts relative to one another is determined by means of evaluating the varying output voltages.

The purpose of the invention is to indicate a machine with members that are rotatable relative to one another, which is set up for the improved determination of a reference position of the two members relative to one another.

The problem of the invention is solved by a machine, comprising a first member, a second member that is rotatable relative to the first member with reference to an axis, a control device, a drive that is connected with the control device for moving the two members relative to one another, a first Hall sensor that is connected with the control device and is arranged on the first member, and a first, second and third magnet, which are arranged next to each other on a common circular trajectory on the second member such that the first Hall sensor is situated in a specific position in the detection zone of the magnets during a rotation of the two members relative to one another, wherein the second magnet which is developed as the center magnet is facing towards the first Hall sensor with another magnetic pole than the first and third magnet.

During the operation of the machine of the invention, which is designed as a robot with a robot arm for example, the first Hall sensor generates a signal, which in particular is an electrical signal, for instance an electrical current or an electrical voltage. If the first Hall sensor is situated in the zone of a magnetic field, then the signal generated by the first Hall sensor changes. Since according to the invention not only one magnet is provided for detecting the specific position, but the three magnets which are arranged next to each other on a common circular trajectory, which moreover are aligned such that the center magnet is facing towards the first Hall sensor with another pole when this is in its detection zone than the other two magnets, a distinct change of the signal of the first Hall sensor results, when this gets into the detection zone of the center one and/or the second magnet. The specific position is particularly a reference position. This makes it possible that the first Hall sensor detects this magnet better, as a result of which an improved detection of the reference position becomes possible.

The second magnet can be facing towards the first Hall sensor with its north pole and the first and third magnets with their south poles, for example. If a positive supply voltage exists on the first Hall sensor, for example, then the signal generated by the first Hall sensor reduces itself initially, if this gets into the detection zone of the first or third magnet, and will then distinctly increase when the first Hall sensor gets into the detection zone of the second magnet. As a result, the second magnet can then be detected better, as previously mentioned.

The control device of the machine of the invention can preferably be equipped to control the drive as part of a reference run such that the two members rotate relative to one another and determine the reference position based upon the signals originating from the first Hall sensor. In order to adjust the two members relative to one another and/or adjust the axis, i.e. in order to determine the reference position, the two members can be rotated relative to one another with reference to the axis as part of the so-called reference run, in particular controlled by the control device. Based upon the signal of the first Hall sensor, the control device is then permitted by means of evaluating the signal to deduce the position of the second magnet in order to determine the reference position.

The polarities of the first, second and third magnet can be selected such that pursuant to an embodiment of the machine as taught by the invention, the signal strength of the first Hall sensor increases and therefore has a rising signal edge as soon as the first Hall sensor gets into the detection zone of the second magnet, and the signal strength of the first Hall sensor drops and therefore has a falling signal edge as soon as the first Hall sensor leaves the detection zone of the second magnet again. To achieve this, a positive supply voltage can be present on the first Hall sensor, for example, and the center one, i.e. the second magnet, can be facing towards the first Hall sensor with its north pole.

The polarities of the first, second and third magnet can be selected such that the signal strength of the first Hall sensor decreases and therefore has a falling signal edge as soon as the first Hall sensor gets into the detection zone of the second magnet, and the signal strength of the first Hall sensor rises and therefore has a rising signal edge as soon as the first Hall sensor leaves the detection zone of the second magnet again.

According to a preferred variant of the machine as taught by the invention, its control device is set up for the determination of the reference position to evaluate the rising and the falling signal edge of the signal of the first Hall sensor.

The control device can in particular be set up to detect the time when the strength of the rising signal edge exceeds a predetermined threshold value and to detect the time when the strength of the falling signal edge drops below the predetermined threshold value. Then it is possible that the control device determines the mean value of these two times in order to deduce the reference position based upon the mean value. Based upon this design, the influence of a varying first Hall sensor, the signal of which drops because of aging processes, for example, is lower than when only a threshold value for the detection of the magnet is utilized. The machine as taught by the invention is preferably designed as a robot, which has a robot arm with several, consecutively arranged members, which, controlled by the control device, are rotatable relative to one another with reference to axes by means of drives. At least two of these members are provided with the first Hall sensor and/or with the first, second and third magnet, in order to determine their reference position.

According to a preferred embodiment of the machine of the invention designed as a robot, a first Hall sensor and in each case a first, second and third magnet are respectively assigned to at least two of these axes, which are arranged on the respective members assigned to the axes in question, wherein the first Hall sensors are connected to a common lead, on which the signals generated by the first Hall sensors are present. As a result, it is possible to reduce the complexity for the cabling of the first Hall sensors.

In order to achieve that the signals of the individual first Hall sensors are not interfering with each other, for example, or at least less severe, electrical valves, in particular diodes can be provided, where respectively one of them is connected between the individual first Hall sensors and the common lead, especially in the forward direction. The diodes are in particular Schottky diodes.

In order to better adjust the individual axes and/or members, according to one embodiment of the machine designed as a robot, the control device is set up to at least move those members, the reference positions of which the control device does currently not determine such that the corresponding first Hall sensors are located in the detection zone of their respective first or third magnets, and subsequently rotate those members relative to one another and determine their reference position as part of a reference run, based upon the signals originating from the first Hall sensor in question. If a positive supply voltage is present on the first Hall sensors, for example, the center ones, i.e. the respective second magnets are facing with their north poles towards their first Hall sensors, then it is possible that those first Hall sensors, which are currently not utilized for an adjustment, generate a relatively low voltage as a signal, if they are located in the detection zone of the respective first or third magnets, so that on the common lead essentially merely the signal of the one first Hall sensor is present, which is used for the determination of the actual reference position.

A further aspect of the invention relates to a machine, comprising a first member, a second member rotatable relative to the first member with reference to an axis, a control device, a drive connected with the control device for moving the two members relative to one another, at least one non-contacting sensor connected with the control device and arranged on the first member, which generates a specific signal intended for the control device during a maximum predetermined relative rotation of the two members. This machine as taught by the invention, which is preferably designed as a robot with a robot arm, can also comprise the first Hall sensor and the first, second and third magnet, so that this machine can also determine the reference position of the member in question. The non-contacting sensor is particularly a second Hall sensor.

The control device can then be set up to evaluate the signals from the non-contacting sensor, and based upon the evaluated signals, stop the relative motion of the two members. Therefore, a non-contacting limit stop can be realized by means of the non-contacting sensor.

According to an embodiment of the machine as taught by the invention, this can have a fourth magnet, which is arranged on the second members such that during a rotation in a first direction of rotation of the two members relative to one another, the second Hall sensor is located in the detection zone of the fourth magnet during a first maximum permissible relative motion of the two members, and comprise a fifth magnet, which is arranged on the second member such that during a rotation in a direction of rotation of the two members relative to one another in a direction of rotation that is opposite to the first direction of rotation, the second Hall sensor, or a further Hall sensor on the first member connected to the control device, is located in the detection zone of the fifth magnet during a second, maximum permissible relative motion of the two members.

Preferably the fourth magnet, if it is located in the detection zone of the second Hall sensor, is facing towards the second Hall sensor with a different magnetic pole than the fifth magnet.

Pursuant to a further embodiment of the machine as taught by the invention, it comprises a further magnet which is arranged on the second member such that during a rotation of the two members the further Hall sensor is located in a specific reference position in the detection zone of the further magnet and the control device is set up to control the drive as part of a reference run such that the two members rotate relative to one another and to determine the reference position based upon the signals originating from the further Hall sensor.

Consequently, pursuant to this variant, an integrated adjustment and monitoring devices realized which includes the further, the fourth and the fifth magnet, as well as the further and second Hall sensor. In addition, particularly the further Hall sensor can be the first Hall sensor, so that the functionality of monitoring the maximum permissible relative rotation and the determination of the reference position is realized by a common adjusting and monitoring device, which includes the first, second, third, fourth and fifth magnet as well as the first and second Hall sensor.

According to a preferred variant of the machine as taught by the invention, all magnets are arranged on the same circular trajectory on the second member. Depending on the type of embodiment, the first, second, third, fourth and fifth magnet is arranged on the same circular trajectory, for example, or the fourth and fifth magnet as well as the further magnet.

Figure 2:
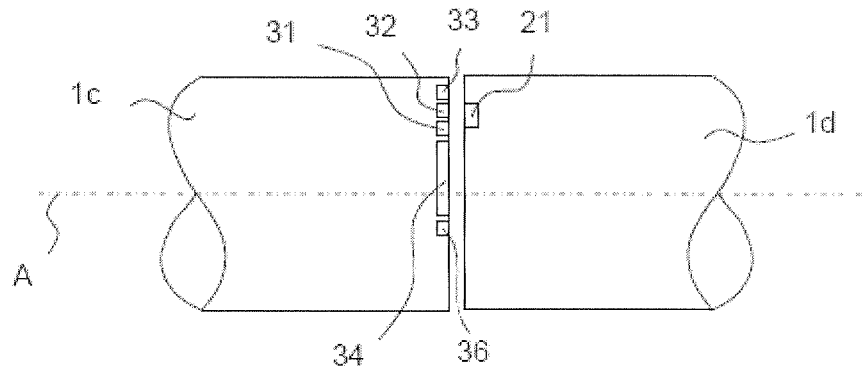
Figure 4:
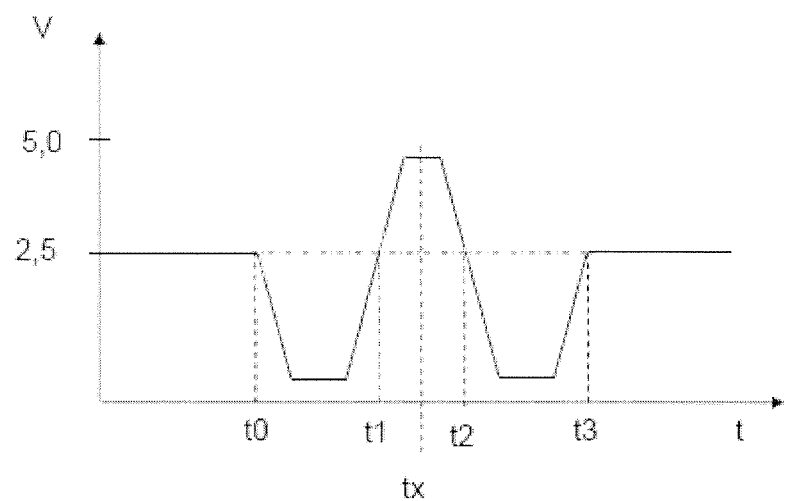
Figure 3:
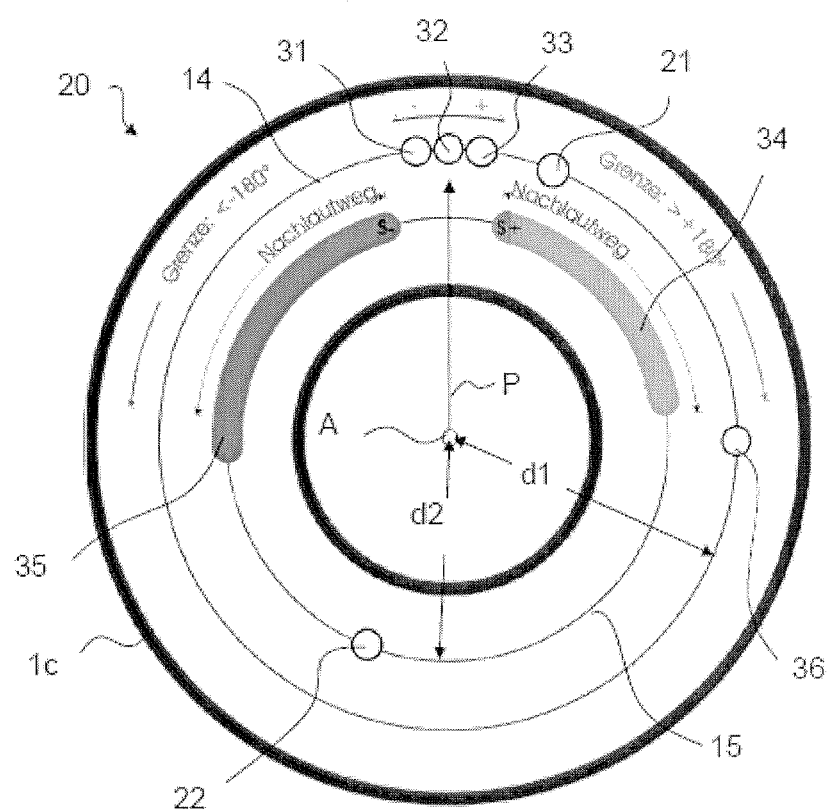
Figure 6:
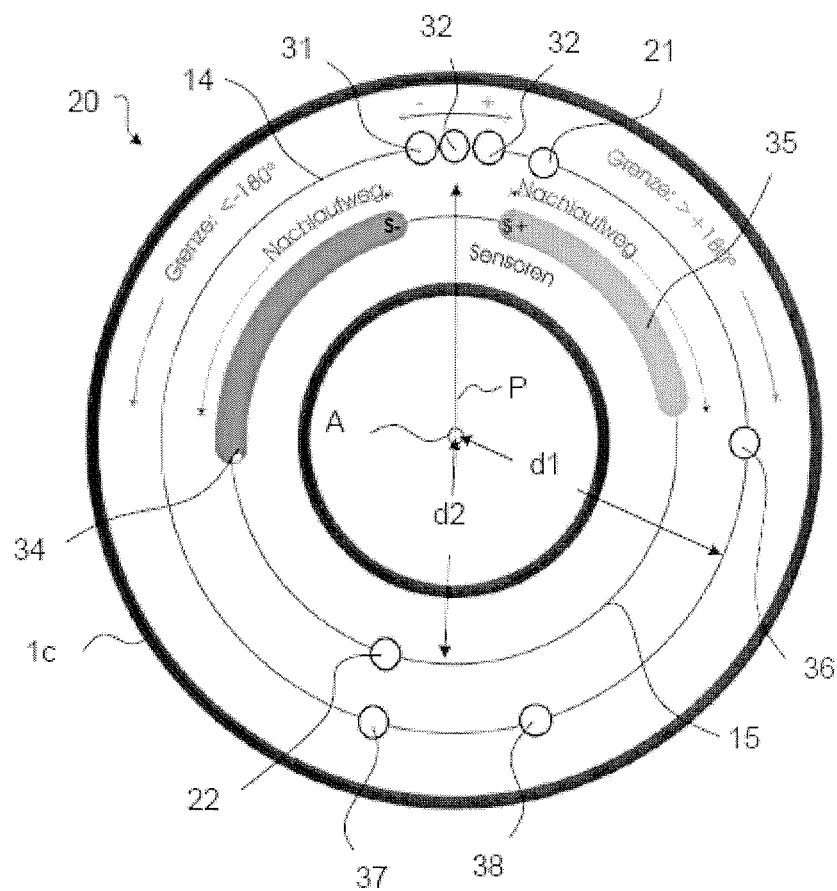
Figure 8:
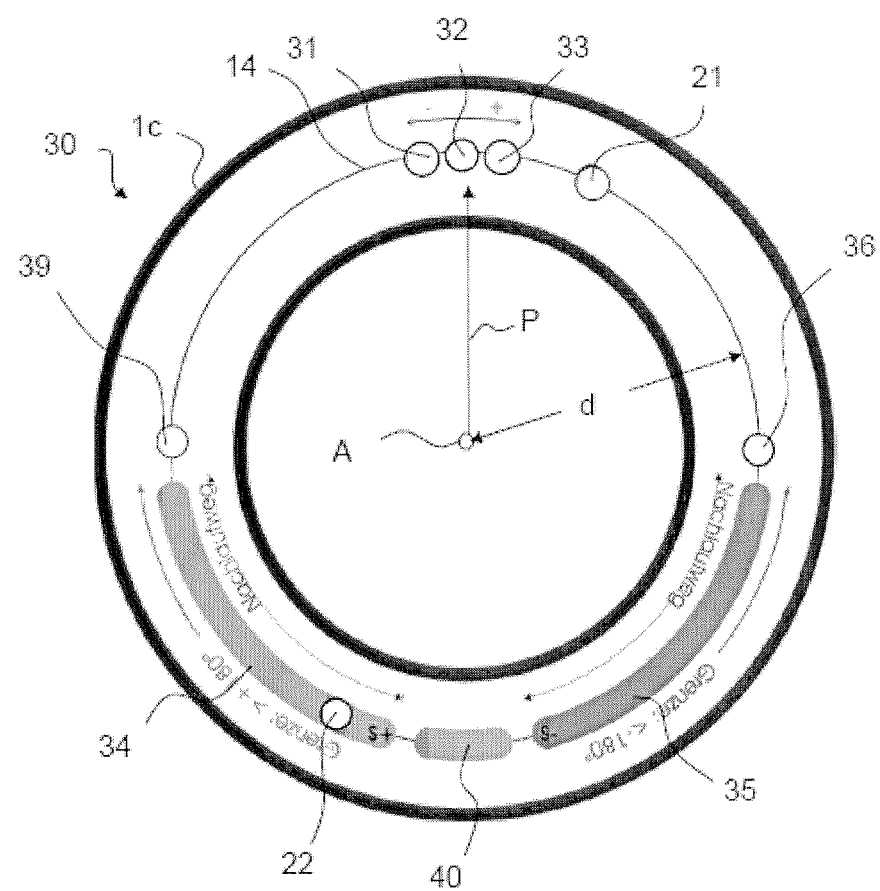
Figure 10:
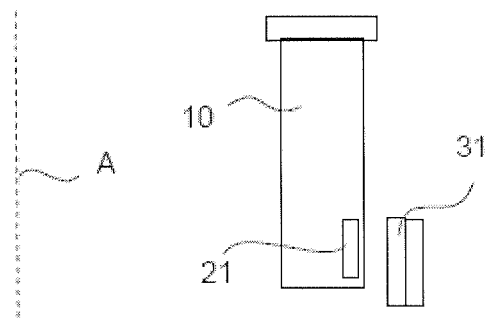
Figure 11:
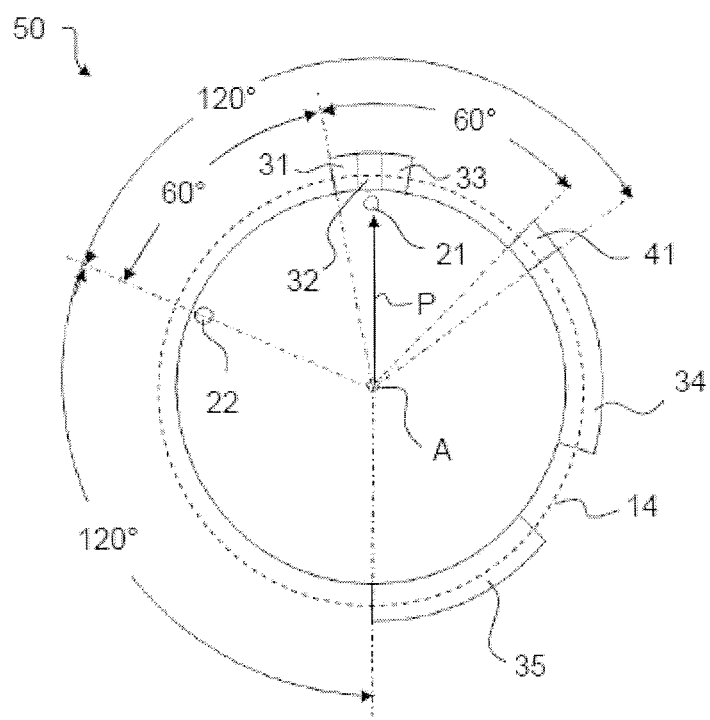
Figure 12:
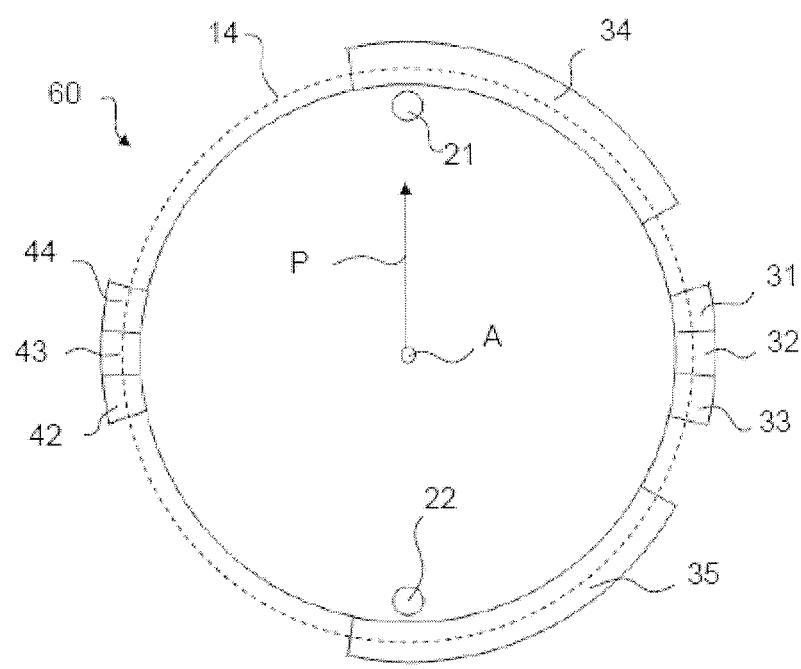
Figure 13:
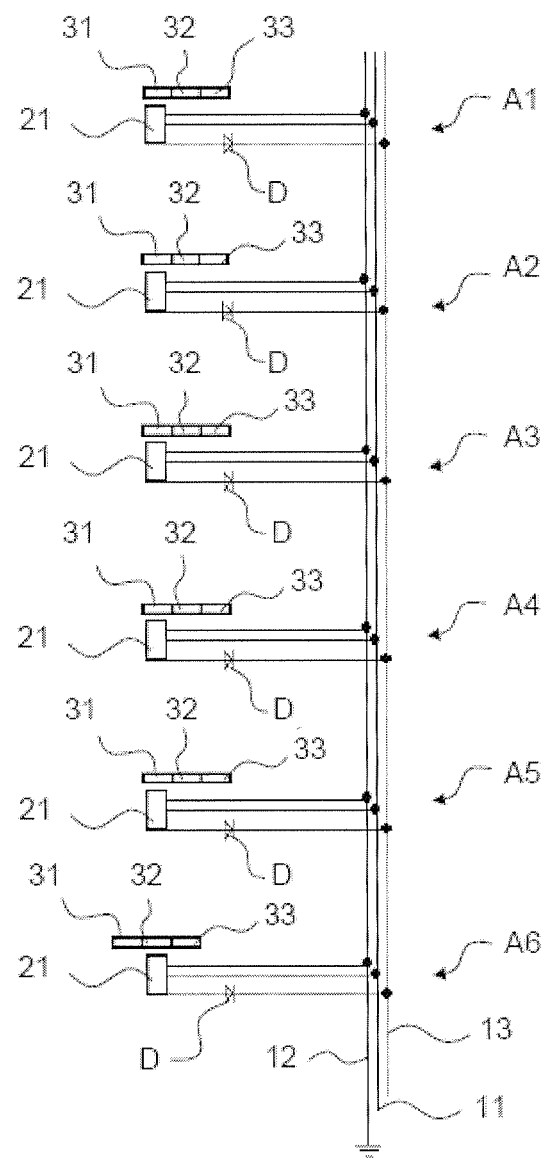

Exemplary embodiments of the invention are illustrated in the attached schematic drawings, as follows:

FIG. 1 shows a robot with a robot arm and a control device,

FIG. 2 shows a lateral view of two members of the robot arm, which are provided with an adjusting and monitoring device, FIG. 3 shows components of the adjusting and monitoring device, FIG. 4 shows an output signal of a Hall sensor of the adjusting device, FIG. 5 shows a Table assigned to the adjusting and monitoring device of FIG. 4, FIG. 6 shows components of a further adjusting and monitoring device, FIG. 7 shows a Table assigned to the adjusting and monitoring device of FIG. 6, FIG. 8 shows components of a further adjusting and monitoring device, FIG. 9 shows a Table assigned to the adjusting and monitoring device of FIG. 8, FIG. 10 shows a Hall sensor and a magnet, FIGS. 11 and 12 show components of further adjusting and monitoring devices, and FIG. 13 shows an electrical circuit.

FIG. 1 shows a robot R, which has a robot arm M and a control device S. The robot arm M represents essentially the movable part of the robot arm R and includes several, consecutive members 1a-1g which are connected with each other by means of joints 2. The robot arm M has a mounting device 3 on one of its ends in the form of a flange, for example, on which an end effector in the form of a gripper 4 can be attached, for example.

The gripper 4 has gripping jaws 5, for example, by means of which the gripper 4 can hold an object 6, so that this can be moved by means of the robot R.

The robot arm M furthermore has drives (not further detailed) connected with the control device S, by means of which the members 1 can be moved with reference to the axes assigned to the joints 2, relative to one another.

The drives are electrical drives, for example, and are controlled by the control device S, particularly during the automatic operation of the robot R, so that the mounting device 3 or a so-called Tool Center Point of the robot R automatically performs a predetermined movement. A corresponding user program runs on the control device S for this purpose. The control device S can particularly be designed such that it controls the drives in the automatic operation. Also the gripper 4 is connected to the control device S, so that this can control the gripping and releasing of the object 6.

In the case of the present embodiment, the robot R and/or the robot arm M has an adjusting and monitoring device 20 which is assigned to the axes A. Preferably each of the axes A is an adjusting and monitoring device 20. The at least one adjusting and monitoring device 20 is in particular integrated into the robot arm M and/or permits the non-contacting adjustment and monitoring of the axis A in question. The adjusting and monitoring device 20 is illustrated in closer detail in the FIGS. 2 and 3, and is in particular connected with the control device S of the robot R, so that this can evaluate signals generated by the adjusting and monitoring device 20, which are particularly electrical signals. The adjusting and monitoring device 20 can be a combined design, if necessary, or be also a split version, i.e. as an adjusting device and as a monitoring device independent of the adjusting device.

On the one hand, the robot R and/or its control device S can determine a reference position P of the members 1c, d, which are assigned to the axis A by means of the adjusting and monitoring device 20, in particular a zero angle. On the other hand, the adjusting and monitoring device 20 is also provided to detect a maximum predetermined relative rotation of the two members 1c, d, so that the control device S can stop any further movement of the members 1c, d relative to one another. Therefore, the end stops of the members 1c, d are realized by means of the adjusting and monitoring device 20.

In the case of the present embodiment, the adjusting and monitoring device 20 has a first Hall sensor 21 connected with the control device S and a second Hall sensor 22 connected with the control device S, both of which are arranged on the same member 1c and for that reason are also immovable relative to this member 1c. In the case of the present embodiment, the two Hall sensors 21, 22 are arranged on member 1d at an angle of 180° relative to one another, however with different distances d1, d2 in the radial direction to axis A.

The adjusting and monitoring device 20 has six magnets in the present embodiment, namely a first magnet 31, a second magnet 32, a third magnet 33, a fourth magnet 34, a fifth magnet 35, and an optional sixth magnet 36, all of which are arranged on member 1c, which is rotatable relative to the member 1d with reference to the axis A, on which the two Hall sensors 21, 21 are arranged. The first, second, third and sixth magnet 31-33, 36 are assigned to the adjustment functionality of the adjusting and monitoring device 20, and are in particular arranged on a common circular trajectory 14 on member 1c.

The first, second and third magnet 31-33 and the first Hall sensor 21 are provided to determine the reference position, particularly the zero angle of the two members 1c, d relative to one another. To achieve this, the member 1d is rotated by the control device S about the axis A relative to the member 1c, as part of a so-called reference run. Based upon the magnets 31-33, the electrical output signal of the first Hall sensor 21 changes when this is moved past the magnets 31-33. The output signal of the first Hall sensor 21 is in particular an electrical voltage.

The first, second and third magnet 31-33 are relatively close together and arranged next to each other on the common circular trajectory 14 and are aligned such in direction of the passing first Hall sensor 21 that the center magnet, i.e. the second magnet 32 points with another magnetic pole in the direction of the first Hall sensor 21 that is moving past than the other two magnets, i.e. the first and the third magnet 31, 33. In the case of the present embodiment, the first and the third magnet 31, 33 are aligned with their south poles in direction of the first Hall sensor 21 moving past and the center one, i.e. the second magnet 32 is aligned with its north pole in the direction of the first Hall sensor 21 moving past.

In the case of the present embodiment, the output voltages of the Hall sensors 21, 22 are approximately 2.5 V, as long as no magnetic field affects the respective Hall sensor 21, 22. If the first and/or the second Hall sensor 21, 22 is moved past a south pole and/or if it is located in the detection zone of a south pole, its output voltage drops to approximately 0.2 V. If the first and/or the second Hall sensor 21, 22 is moved past a north pole and/or if it is located in the detection zone of a north pole, its output voltage increases to approximately 4.8V. Based upon the arrangement of the first, second and third magnet 31-33 of the adjusting and monitoring device 20, in the case of the present embodiment, an electrical voltage curve of the output voltage of the first Hall sensor 21 that is shown in FIG. 4 results.

During a clockwise rotation of the first Hall sensor 21 relative to the magnets 31-33, for example, this is initially not exposed to any magnetic field and has an output voltage of approximately 2.5 V. The first Hall sensor 21 initially gets into the detection zone of the first magnet 31 at time to, as a result of which the output voltage of the first Hall sensor 21 is decreased to approximately 0.2 V. A little later, the first Hall sensor 21 gets into the detection zone of the center one, i.e. the second magnet 32, as a result of which the output voltage of the first Hall sensor 21 rises to approximately 4.8 V and exceeds a threshold of 2.5 V at time t1. A little later, the first Hall sensor 21 gets into the detection zone of the third magnet 33, as a result of which the output voltage of the first Hall sensor 21 drops to approximately 0.2V again and falls below a threshold of 2.5 V at time t2. The first Hall sensor 21 leaves the magnetic detection zone of the third magnet 33 at time t3, as a result of which the output voltage of the first Hall sensor 21 reaches approximately 2.5 V again.

To now determine the reference position, the control device S determines a time tx, which is calculated from the difference between the times t2 and t1. On the basis of the time tx it is consequently possible for the control device S to deduce the reference position P. Therefore, for evaluating the reference position P, both the rising as well as the falling edge of the output signal of the first Hall sensor 21 is used.

Consequently this also reduces the risk that the adjustment could be drifting due to aging of the first Hall sensor 21, based upon which this will provide a reduced output voltage and/or a small output signal. If necessary, a computation of adjustment across relatively broad areas of the rising and falling edge of the output signal of the first Hall sensor 21 can be performed.

To check the functionality of the first Hall sensor 21, the reference run can again be repeated in order to check the results of both reference runs. If the determined reference positions P differ by a predetermined value, then the control device S can generate a corresponding alert, for example. Also the optional sixth magnet 36 of the adjusting and monitoring device 20, which in the case of the present embodiment is arranged at an angle of 90° relative to the second magnet 32 on member 1c and on the same circular trajectory 14 as the first, second and third magnet 31-33, can be used for checking the adjusting and monitoring device 20. It can thus be provided that the control device S only deduces during the reference run if the reference position P was determined successfully, if the sixth magnet 36 is detected at an angle of 90° including a predetermined tolerance relative to the second magnet 32 (adjustment reference) by means of the first Hall sensor 21.

The fourth and fifth magnet 34, 35 and the second Hall sensor 22 are provided to monitor the maximum permissible range of swiveling of the two members 1c, d relative to one another, so that the control device S can stop the motion of the members 1c, d, relative to one another, if necessary. In the case of the present embodiment, the range of swiveling is limited to larger than 360°, i.e. larger than ±180° based on the reference position P.

The fourth and fifth magnet 34, 35 of the adjusting and monitoring device 20 are arranged on member 1d, and are on a common circular trajectory 15.

In the case of the present embodiment, the fourth and the fifth magnet 34, 35 of the adjusting and monitoring device 20 are arranged directly next to the first, second and third magnet 31-33 of the adjusting and monitoring device 20, in a tangential direction. In the case of the present embodiment, the fourth and fifth magnet 34, 35 are arranged on the member 1c such that the fourth magnet 34 points with another magnetic pole in the direction of the passing second Hall sensor 22 than the fifth magnet 35. Particularly the fourth and fifth magnet 34, 35, are arranged on member is such that the fourth magnet 34 with its south pole and the fifth magnet 35 with its north pole points in the direction of the second Hall sensor 22 that is moving past.

If the member 1d rotates clockwise relative to the member 1c in the case of the present embodiment, then the control device S will detect when the end stop in the clockwise direction is reached, if the second Hall sensor 22 gets into the detection zone of the fourth magnet 34 of the adjusting and monitoring device 20. The control device S will consequently generate a signal, based upon which the robot R stops the movement of the robot arm M or at least the relative motion of the two members 1c, d.

If the member 1d rotates counter-clockwise relative to the member 1c in the case of the present embodiment, then the control device S detects when the end stop in the counter-clockwise direction is reached, if the second Hall sensor 22 gets into the detection zone of the fifth magnet 35 of the adjusting and monitoring device 20. The control device S will consequently generate a signal, based upon which the robot R stops the movement of the robot arm M or at least the relative motion of the two members 1c, d.

In the case of the present embodiment, the fourth and fifth magnet 34, 35 respectively extend across an angular range of approximately 85°, as a result of which an overtravel distance for detecting the end stops is realized in each case. In addition, in the case of the present embodiment, the fifth magnet 35 extends across a somewhat expanded angular range than the fourth magnet 34. The fifth magnet 35 extends in particular so far, that a part of these magnets lies opposite the sixth magnet 36 of the adjusting and monitoring device 20. Because in addition, in the case of the present embodiment, the two Hall sensors 21, 21 are arranged opposite, it is thus possible to check the functionality of both Hall sensors 21, 22 by means of the control device S, in that during the reference run at an angle of 90° relative to the reference position P, both Hall sensors 21, 22 should provide an output voltage of approximately 0.2 V.

The conditions of the Hall sensors 21, 22 are summarized in the Table shown in FIG. 5. In this context "upper cut-off region" denotes the detection of the maximum permissible rotation of the member 1d relative to the member 1c in the clockwise direction, and "lower cut-off region" denotes the detection of the maximum permissible rotation of the member 1d relative to the member 1c in the anti-clockwise direction.

In order to better detect the start of the maximum permissible rotational movements, the adjusting and monitoring device 20, can, as illustrated in FIG. 6, have a seventh and an eighth magnet 37, 38, which are arranged at the same distance on member 1c as the first, second and third magnet 31-33 and can therefore interact with the first Hall sensor 21. In this case, the adjusting and monitoring functionalities of the adjusting and monitoring device 20 are coupled, as a result of which the control device 20 can also check the functionality of both Hall sensors 21, 22. In the case of the present embodiment, the seventh magnet 37 is assigned to the detection of the end stop in the clockwise direction and is arranged opposite of the start of the fourth magnet 34 of the adjusting and monitoring device 20. It is aligned such that its north pole points in the direction of the first Hall sensor 21. The eighth magnet is assigned to the detection of the anti-clockwise end stop, and is arranged opposite of the start of the fifth magnet 35 of the adjusting and monitoring device 20. It is aligned such that its south pole points in the direction of the first Hall sensor 21. Consequently, the conditions of the two Hall sensors 21, 22 summarized in the Table illustrated in FIG. 7 result.

FIG. 8 shows a further embodiment of an adjusting and monitoring device 30. Unless described otherwise, then the components of the adjusting and monitoring device 30 shown in FIG. 8, which essentially have the same design and functionality as the components of the adjusting and monitoring device 20 shown in FIG. 3, are provided with the same reference symbols.

Contrary to the adjusting and monitoring device 20 shown in FIG. 3, all magnets of the adjusting and monitoring device 30 shown in FIG. 8 and the two Hall sensors 21, 22, are arranged on a common circular trajectory 14 on member 1c. FIG. 9 shows a Table which summarizes the conditions of the two Hall sensors 21, 22 of the adjusting and monitoring device 30 represented in FIG. 8.

In the case of the adjusting and monitoring device 30 shown in FIG. 8, this can likewise have the optional sixth magnet 36, which is provided for checking the adjustment and/or the first Hall sensor 21. In the case of the present embodiment, this is arranged at an angle of 90° relative to the second magnet 32 on member 1c on the common circular trajectory. In addition, a ninth magnet 39 can be provided, which is arranged opposite of the sixth magnet 36 on member 1c on the common circular trajectory. It can thus be provided that the control device S only deduces during the reference run as to the successful determination of the reference position P, if the sixth magnet 36 is detected at an angle of 90° including a predetermined tolerance relative to the second magnet 32 (adjustment reference) by means of the first Hall sensor 21. Since in addition the two Hall sensors 21, 22 are arranged opposite on member 1d, the control device S can at the same time check the functionality of the second Hall sensor 22, since this is then located in the detection zone of the ninth magnet 39 and therefore provides an output voltage and/or an output signal corresponding to the polarity of the ninth magnet 39, if the functionality is correct. In the case of the present embodiment, the ninth magnet 39 is aligned with its north pole in the direction of the Hall sensors 21, 22, so that the second Hall sensor 22 provides roughly an output voltage of 0.2 V as soon as it is located in the detection zone of the ninth magnet 39. Also the adjusting and monitoring device 30 shown in FIG. 8, in the case of the present embodiment is set up to monitor a maximum range of swiveling of the two members 1c, d, relative to one another, so that the control device S can stop the movement of the members 1c, d relative to one another, if necessary. In the case of the present embodiment, the range of swiveling is likewise limited to larger than 360°, i.e. larger than ±180° with reference to the reference position.

In the case of the present embodiment, the fourth and the fifth magnet 34, 35, by means of which the monitoring functionality of the adjusting and monitoring device 30 is realized, is arranged opposite the first, second and third magnet 31-33. In the case of the present embodiment, the fourth and fifth magnet 34, 35 are arranged on the member 1c such that the fourth magnet 34 points with another magnetic pole in the direction of the passing second Hall sensor 21 than the fifth magnet 35. Particularly the fourth and fifth magnet 34, 35, are arranged on member 1c such that the fourth magnet 34 with its south pole and the fifth magnet 35 with its north pole points in the direction of the second Hall sensor 22 that is moving past.

If the member 1d rotates clockwise relative to the member 1c in the case of the present embodiment, then the control device S will detect when the end stop in the clockwise direction is reached, if the first Hall sensor 21 gets into the detection zone of the fourth magnet 34 of the adjusting and monitoring device 30. The control device S will consequently generate a signal, based upon which the robot R stops the movement of the robot arm M or at least the relative motion of the two members 1c, d.

If the member 1d rotates counter-clockwise relative to the member 1c in the present embodiment, then the control device S detects when the end stop in the counter-clockwise direction is reached, if the first sensor 21 gets into the detection zone of the fifth magnet 35 of the adjusting and monitoring device 30. The control device S will consequently generate a signal, based upon which the robot R stops the movement of the robot arm M or at least the relative motion of the two members 1c, d.

In the case of the present embodiment, still another tenth magnet 40 is provided on member 1c, which is arranged on member 1c opposite the first, second and third magnet 31-33 and is arranged on the common circular trajectory 14. Its volume expansion corresponds to the joint volume expansion of the first, second and third magnet 31-33. The tenth magnet 40 is aligned with its south pole in the direction of the Hall sensors 21, 22, so that the output signal of the second Hall sensor 22 is roughly 0.2 V when the first Hall sensor 21 is located in the detection zone of the first, second and third magnet 31-33.

In the above-mentioned embodiments, the magnets 31-40 and the Hall sensors 21, 22 are arranged on the face side on the members 1c, d. But it is also possible that the Hall sensors 21, 22 are arranged laterally offset to the magnets 31-40. This is shown as an example for the first Hall sensor 21 and the first magnet 31 in FIG. 10.

The Hall sensors 21, 21 are enclosed by a housing 10, for example. The housing 10 is attached on member 1d, for example. The magnets, for example the first magnet 31 of the adjusting and monitoring devices 20, 30 are located with a Hall sensor 21 in a plane perpendicular to axis A. The distance of the Hall sensor 21 to axis A distinguishes itself from the distances of the magnets to the axis A however. In the case of the embodiment shown in FIG. 10, the distance of the first Hall sensor 21 to axis A is smaller than the distances to axis A of the magnets in question. FIGS. 11 and 12 respectively show embodiments of an adjusting and monitoring device in which the magnets and the Hall sensors 21, 22 are arranged offset with reference to the axis A according to FIG. 10.

FIG. 11 shows a further adjusting and monitoring device 50. Unless described otherwise, then the components of the adjusting and monitoring device 50, which essentially have the same design and functionality as the components of the adjusting and monitoring device 30 shown in FIG. 8, are provided with the same reference symbols.

As previously mentioned, the Hall sensors 21, 22 of the adjusting and monitoring device 50 illustrated in FIG. 11, are not arranged on the face sides on the respective members 1c, 1d, but instead as shown in FIG. 10. Also the two Hall sensors 21, 22 are arranged at the same distance to the axis on member 1d and the magnets 31-35, 41 are arranged on a common circular trajectory 14 on member 1c.

According to the adjusting and monitoring device 30 shown in FIG. 8, the first Hall sensor 21 and the first, second, and third magnet 31-33 of the adjusting and monitoring device 50 illustrated in FIG. 11 are provided to adjust the two members 1c, d and/or to determine their reference position P, as part of a reference run. The fourth and the first magnet are provided for monitoring the maximum permissible relative rotational movement of the two members 1c, d. In the case of the present embodiment, the adjusting and monitoring device 50 is set up to limit the range of swiveling of the two members 1c, d relative to one another to an angle smaller then 360°, in particular to ±120° relative to the reference position P. In addition, the control device S for the monitoring of the relative motion of the two members 1c, d relative to one another evaluates not only the signals of the second Hall sensor 21, but also the signals of the first Hall sensor 21.

In the case of the present embodiment, the two Hall sensors 21, 22 are arranged offset at an angle of 60° to one another on member 1d, wherein the first Hall sensor 21 runs ahead of the second Hall sensor 22 during a clockwise rotation of the member 1d. The fourth and the fifth magnet 34, 35 extend across an angle of 50°, wherein the fourth magnet 34 is arranged to the second magnet 32 at an angle of 60° in a clockwise direction on member 1c. The fifth magnet 35 is offset by 20° from the fourth magnet 34 in a clockwise direction. In addition, an eleventh magnet 41, the volume expansion of which corresponds to the first magnet 31, is positioned upstream of the fourth magnet. When the member 1d rotates clockwise relative to member 1c, then the control device S detects that the rotation of the member 1d relative to member 1c is limited, when the second Hall sensor 22 is located in the detection zone of a south pole and when the first Hall sensor 21 is located in the detection zone of a north pole or when it is exposed to none and/or only a relatively weak magnetic field. Based upon the arrangement of the magnets 31-35, 41, the control device S therefore detects when the maximum permissible relative motion is reached during a clockwise rotation, when the second Hall sensor 22 is located in the detection zone of the fourth magnet 34. When the member 1d rotates counter-clockwise relative to member 1c, then the control device S detects that the rotation of the member 1d relative to member 1c is limited, when the second Hall sensor 22 is located in the detection zone of a north pole and when the first Hall sensor 21 is located in the detection zone of a north pole and when it is exposed to none and/or only a relatively weak magnetic field. Based upon the arrangement of the magnets 31-35, 41, the control device S therefore detects when the maximum permissible relative motion is reached during a counter-clockwise rotation, when the second Hall sensor 22 is located in the detection zone of the fifth magnet 35.

FIG. 12 shows a further adjusting and monitoring device 60. Unless described otherwise, then the components of the adjusting and monitoring device 60, which essentially have the same design and functionality as the components of the adjusting and monitoring device 50, are provided with the same reference symbols.

According to the adjusting and monitoring device 50 of FIG. 11, the further adjusting and monitoring device 60 shown in FIG. 12 is provided, to limit the range of swiveling of the two members 1c, d relative to one another to an angle smaller than 360°, in particular to ±170° relative to the reference position. In addition, the two Hall sensors 21, 22 are arranged at the same distance to axis A on member 1d and the magnets 31-35 on member 1c are arranged on the common circular trajectory 14. On the other hand, the Hall sensors 21, 22 are arranged opposite.

The first, second and third magnet 31-33 as well as the first Hall sensor 21 are provided for the control device S to determine the reference position P of the two members 1c, d, as part of a reference run, as previously described. In the case of the present embodiment, the reference position is offset counter-clockwise by 90° with reference to the second magnet, however.

The fourth and the fifth magnet 34, 35 extend in the case of the present embodiment across 60°. The fourth magnet 34 extends in particular at an angle of 10° counter-clockwise relative to the reference position P and at an angle of 50° relative to the reference position P in the clockwise direction. The fifth magnet 35 particularly extends from an angle of 130° to 190° relative to the reference position P in the clockwise direction. When the member 1d rotates counter-clockwise relative to member 1c, then the control device S detects that the rotation of the member 1d relative to member 1c is limited, when the first Hall sensor 21 is located in the detection zone of a north pole and when the second Hall sensor 22 is exposed to none and/or only a relatively weak magnetic field or is located in the detection zone of a south pole. Based upon the arrangement of the magnets 34, 35, the control device S therefore detects when the maximum permissible relative motion is reached during a counter-clockwise rotation, when the first Hall sensor 21 is located in the detection zone of the fifth magnet 35. When the member 1d rotates clockwise relative to member 1c, then the control device S detects that the rotation of the member 1d relative to member 1c is limited, when the second Hall sensor 22 is located in the detection zone of a south pole and when the first Hall sensor 21 is exposed to none and/or only a relatively weak magnetic field or is located in the detection zone of a north pole. Based upon the arrangement of the magnets 34, 35, the control device S therefore detects when the maximum permissible relative motion is reached during a clockwise rotation, when the second Hall sensor 22 is located in the detection zone of the fourth magnet 34.

To prevent that the control device S does not deduce that a maximum permissible relative motion has been reached, when the first Hall sensor 21 is located in the detection zone of the second magnet 32 or the first Hall sensor is in the detection zone of the first or third magnet 31, 33, a 12th, 13th, and 14th magnet 42-44 are provided in the case of the present embodiment, which compared to the first, second and third magnet 31-33 are arranged on the common circular trajectory 14, same as the remaining magnets 31-35 of the adjusting and monitoring device 60. In particular, the 13th magnet 43 is arranged lying opposite the second magnet 32 and with its north pole is facing towards the Hall sensors 21, 22. The 12th and 14th magnet is arranged opposite the first and the third magnet 31, 33. Their south poles are facing towards the Hall sensors 21, 22.

If several axes A of the robot R are equipped with an adjusting and monitoring device 20, 30, 50, 60, or at least with one adjusting device, which has the first Hall sensor 21 and the first, second and third magnet 31-33, then the individual Hall sensors can be wired according to a circuit illustrated in FIG. 13.

In the case of the embodiment shown in FIG. 13, one adjusting device each is assigned to six axes A1-A6 of the robot R, each of which has a first Hall sensor 21 and respectively a first, second and third magnet 31-33.

In the case of the present embodiment, the first Hall sensors 21 are supplied from a common supply voltage by a common electrical line 11. The supply voltage is 5 V, for example. The first Hall sensors 21 are moreover connected to ground by means of a further common electrical line 12. The output signals of all first Hall sensors 21 exist on a further common line 13, which is connected with the control device S for evaluation. To prevent or at least reduce interference of the individual first Hall sensors 21 with one another, a diode D is connected in the forward direction between the respective first Hall sensors 21 and the line 13 for the output signals in each case. The diodes are in particular Schottky diodes.

In order to adjust the individual members of the robot arm M assigned to the axes A1-A6, in the case of the present embodiment, initially the control device S controls the drives of the robot R such that all first Hall sensors 21 are located in the detection zone of their first magnets 31. It is also possible that the robot arm M, controlled by the control device S, is aligned such that the first Hall sensors 21 are located in the detection zone of the third magnets 33 in each case. But at least the robot arm M is moved such, so that those first Hall sensors 21 are located either in the detection zone of their first or third magnets 31, 33, the axes of which and/or their assigned members will currently not be adjusted. In the case of the present embodiment, these are the axes A1-A5.

The control device S subsequently controls those members which must be adjusted. In the case of the present embodiment, these are the members which are assigned to the axis A6. The adjustment of the members in question is carried out as already described above.

Thereafter, the remaining axes A1-A5 and/or their assigned members are adjusted, wherein the first Hall sensors 21 assigned to the non-involved axes are brought into the detection zone of their first or the third magnets 31, 33 for the respective adjustment.

The invention claimed is:

1. A machine, comprising:
a first member,
a second member that is rotatable relative to the first member with reference to an axis,
a control device,
a drive, which is connected with the control device for moving the first and second members relative to one another,
a Hall sensor that is connected with the control device and is arranged on the first member, and
first, second and third magnets, which are arranged next to each other on a common circular trajectory on the second member such that the Hall sensor is situated in a specific position in a detection zone of the magnets during a rotation of the two members relative to one another, wherein the second magnet which is developed as the center magnet is facing towards the Hall sensor with another magnetic pole than the first and third magnets;

wherein the control device is set up to control the drive as part of a reference run such that the first and second members rotate relative to one another and determine the position based upon signals originating from the Hall sensor, wherein the strength of the signal of the Hall sensor increases and therefore has a rising signal edge, as soon as the Hall sensor gets into the detection zone of the second magnet, and the strength of the signal of the Hall sensor drops and therefore has a falling signal edge, as soon as the Hall sensor leaves the detection zone of the second magnet again, the control device of which is set up to evaluate the rising and falling signal edge of the Hall sensor to determine the position.

2. The machine according to claim 1, in which the second magnet in the detection zone with its north pole and the first and third magnet in the detection zone with their south poles are facing towards the Hall sensor.

3. The machine according to claim 1, the control device of which is set up to determine a first time, when the strength of the rising signal edge exceeds a predetermined threshold value and to detect a second time when the strength of the falling signal edge drops below the predetermined threshold value.

4. The machine according to claim 3, in which the control device is set up to determine the mean value of the first and second times in order to deduce the reference position based upon the mean value.

5. The machine according to claim 1, which is designed as robot, which has a robot arm with several consecutively arranged members, which, controlled by the control device are rotatable relative to one another by means of drives with reference to axes, and at least two of these axes are each assigned a Hall sensor and first, second, and third magnets, which are arranged on corresponding members assigned to the respective axes, wherein the Hall sensors are connected on a common line on which the signals exist that are generated from the Hall sensors.

6. The machine according to claim 5, comprising electrical valves connected between the individual Hall sensors and the common line.

7. The machine according to claim 5, the control device of which is set up to move at least those members, the positions of which the control device does not determine currently such that the corresponding Hall sensors are located in the detection zone of their respective first or third magnets, and subsequently as part of a reference run rotate those members relative to one another, whose assigned position is to be determined, and to determine the corresponding position based upon the signals originating from the respective Hall sensor.

8. A machine, comprising:
a first member,
a second member rotatable relative to the first member with reference to an axis,
a control device,
a drive connected with the control device for moving the first and second members relative to one another,
at least one Hall sensor connected with the control device and arranged on the first member, which during a maximum predetermined relative rotation of the two members generates a signal intended for the control device,
a first magnet, which is arranged on the second member such that during a rotation in a first direction of rotation of the first and second members relative to one another the Hall sensor during a first maximum permissible relative motion of the two members is located in the detection zone of the first magnet, and
a second magnet, which is arranged on the second member such that during a rotation in a second direction of rotation of the first and second members relative to one another which is opposite to the first direction of rotation, the Hall sensor or a further Hall sensor arranged on the first member and connected with the control device is located in the detection zone of the second magnet during a second maximum permissible relative motion of the first and second members.

9. The machine according to claim 8, the control device of which is set up to evaluate the signals originating from the Hall sensor and to stop the relative movement of the first and second members based upon the evaluated signals.

10. The machine according to claim 8, in which the first magnet is facing another magnetic pole towards the Hall sensor than the second magnet.

11. The machine according to claim 8, comprising a third magnet, which is arranged on the second member such that during a rotation of the two members relative to one another the further Hall sensor is located at a specific reference position in the detection zone of the third magnet and the control device is set up to control the drive is part of the reference run such that the two members rotate relative to one another to determine the reference position based upon the signals originating from the further Hall sensor.

12. The machine according to claim 8, in which the first and second magnets are arranged on the same circular trajectory on the second member.

13. A machine, comprising
a first member,
a second member that is rotatable relative to the first member with reference to an axis,
a control device,
a drive, which is connected with the control device for moving the two members relative to one another,
a Hall sensor that is connected with the control device and is arranged on the first member, and
first, second, and third magnets, which are arranged next to each other on a common circular trajectory on the second member such that the Hall sensor is situated in a specific position in a detection zone of the magnets during a rotation of the first and second members relative to one another, wherein the second magnet which is developed as the center magnet is facing towards the Hall sensor with another magnetic pole than the first and third magnets,
wherein the control device is set up to control the drive as part of a reference run such that the two members rotate relative to one another and determine the position based upon signals originating from the Hall sensor, wherein the strength of the signal of the Hall sensor drops and therefore has a falling signal edge, as soon as the Hall sensor gets into the detection zone of the second magnet, and the strength of the signal of the Hall sensor rises and therefore has a rising signal edge, as soon as the Hall sensor leaves the detection zone of the second magnet again, the control device of which is set up to evaluate the rising and falling signal edge of the Hall sensor to determine the position.

14. The machine according to claim 13, in which the second magnet in the detection zone with its north pole and the first and third magnet in the detection zone with their south poles are facing towards the Hall sensor.

15. The machined according to claim 13, in which the control device is set up to determine a first time, when the strength of the rising signal edge exceeds a predetermined threshold value and to detect a second time when the strength of the falling signal edge drops below the predetermined threshold value.

16. The machined according to claim 15, in which the control device is set up to determine the mean value of the first and second times in order to deduce the reference position based upon the mean value.

17. The machine according to claim 13, which is designed as robot, which has a robot arm with several consecutively arranged members, which, controlled by the control device are rotatable relative to one another by means of drives with reference to axes, and at least two of these axes are each assigned the Hall sensor and the first, second, and third magnets, which are arranged on corresponding members assigned to the axes in question, wherein the (Hall sensors are connected on a common line on which the signals exist that are generated from the Hall sensors.

18. The machine according to claim 17, comprising electrical valves connected between the individual Hall sensors and the common line.

19. The machine according to claim 17, the control device of which is set up to move at least those members, the positions of which the control device does not determine currently such that the corresponding Hall sensors are located in the detection zone of their respective first or third magnets, and subsequently as part of a reference run rotate those members relative to one another, whose assigned position is to be determined, and to determine the corresponding position based upon the signals originating from the associated Hall sensor.

* * * * *

UNITED STATES PATENT AND TRADEMARK OFFICE
CERTIFICATE OF CORRECTION

| | | |
|---|---|---|
| PATENT NO. | : 8,829,895 B2 | Page 1 of 2 |
| APPLICATION NO. | : 13/444499 | |
| DATED | : September 9, 2014 | |
| INVENTOR(S) | : Gernot Nitz et al. | |

It is certified that error appears in the above-identified patent and that said Letters Patent is hereby corrected as shown below:

In the Specification:

Column 6,
Line 50 reads "both the rising as well as . . . is used" and should read -- both the rising as well as . . . are used --.

Column 7,
Lines 30-32 read "fourth magnet 34 with its south pole and the fifth magnet 35 with its north pole points" and should read -- fourth magnet 34 with its south pole and the fifth magnet 35 with its north pole point --.

Column 9,
Lines 20-21 read "fourth magnet 34 with its south pole and the fifth magnet 35 with its north pole points" and should read -- fourth magnet 34 with its south pole and the fifth magnet 35 with its north pole point --.

Column 12,
Line 1 reads "The 12th and 14th magnet is arranged" and should read -- The 12th and 14th magnets are arranged --.

In the Claims:

Claim 11, Column 14,
Line 25 reads "device is set up to control the drive is part of the reference run" and should read -- device is set up to control the drive as part of the reference run --.

Claim 15, Column 15,
Line 1 reads "The machined according to claim" and should read -- The machine according to claim --.

Signed and Sealed this
Twenty-third Day of June, 2015

Michelle K. Lee
*Director of the United States Patent and Trademark Office*

CERTIFICATE OF CORRECTION (continued)
U.S. Pat. No. 8,829,895 B2

Claim 16, Column 15,
Line 1 reads "The machined according to claim" and should read -- The machine according to claim --.

Claim 17, Column 16,
Line 1 reads "wherein the (Hall sensors are" and should read -- wherein the Hall sensors are --.